United States Patent [19]

Maletsky et al.

[11] Patent Number: 4,939,202

[45] Date of Patent: Jul. 3, 1990

[54] BARRIER GUARD MOISTURE-PROOF ADHESIVE

[75] Inventors: Albert Maletsky, Franklin Lakes; Denis P. Nolan, Piscataway; Betty Jean Polito, Hawthorne, all of N.J.

[73] Assignee: The International Group, Inc., Lyndhurst, N.J.

[21] Appl. No.: 165,980

[22] Filed: Mar. 9, 1988

[51] Int. Cl.$^5$ .............................................. C08L 23/12
[52] U.S. Cl. ..................................... 524/528; 525/240
[58] Field of Search ......................... 525/240; 524/528

[56] References Cited

U.S. PATENT DOCUMENTS 3,577,372 5/1971 Flanagan et al. .................. 525/240
3,634,546 1/1972 Hagemeyer et al. ................ 525/240
4,022,728 5/1977 Trotter et al. ...................... 525/240
4,076,670 2/1978 Godfrey .............................. 525/240
4,460,364 7/1984 Chen .................................... 604/387

Primary Examiner—Carman J. Seccuro
Attorney, Agent, or Firm—Sprung, Horn, Kramer & Woods

[57] ABSTRACT

This invention relates to a moisture-proof adhesive coating composition comprising an antioxidant and a blend of an amorphous polymer of propylene, a crystalline polymer of propylene and a resinous mixture of $C_4$ to $C_{10}$ hydrocarbons derived from the polymerization and hydrogenation of a petroleum feedstock and to a method of using and producing the blend of this invention.

8 Claims, No Drawings

BARRIER GUARD MOISTURE-PROOF ADHESIVE

In one aspect the invention relates to a novel moisture-proof adhesive coating material. In another aspect the invention relates to a process for preparing the present coating material and in still another aspect the invention pertains to the use of the composition.

BACKGROUND OF THE INVENTION

Various blends involving styrene-butadiene-styrene, styrene-isoprene-styrene, styrene-ethylene-butylene-styrene, ethyl vinyl acetate and their copolymers have been formulated as moisture-resistant barriers for hot melt coating on a substrate. Although coatings of these blends possess moisture resistance properties and are stable at temperatures up to 275°–300° F., they have relatively low bond strength and are hampered by a tack time up to about 5 minutes. Also, they do not provide ideal moisture-proof barriers when coated on non-woven substrates.

Low molecular weight polyethylene has also been considered for moisture resistant barriers; however, such coatings have low flexibility and are crisp and irritating to the touch. Accordingly, they are not suitable for articles of apparel or articles worn next to the skin, such as for example disposable diapers. In order to improve flexibility, formulations of polyethylene with elastomers or ethylene vinyl acetate have been proposed. Such blends are unsatisfactory since they require a high coat weight of 50–75 grams/meter$^2$ on the substrate in order to retain moisture resistant properties, which in turn causes stiffness and thus defeats the purpose of formulation. Also, the amount of formulation required results in an objectionable bulky coating.

Accordingly, it is an object of this invention to overcome the above deficiencies while retaining the advantageous properties achieved by the combination of previous components.

Another object of this invention is to provide a continuous, pin-hole free coating to be used as a moisture-proof barrier on a substrate.

Still another object is to provide an efficient and economical method for preparing and applying a moisture-proof adhesive composition.

Yet another object is to provide a moisture-proof adhesive coating having excellent bonding properties and the ability to interlock with a wide variety of substrate materials.

These and other objects of the invention will become apparent from the following description and disclosure.

THE INVENTION

In accordance with this invention a moisture-proof adhesive blend is provided containing between about 40 and about 95 wt. % of a homopolymer or copolymer of amorphous polypropylene; between about 0 and about 50 wt. % of a homopolymer or copolymer of crystalline polypropylene and between about 5 and about 40 wt. % of a resinous mixture of $C_4$ to $C_{10}$ hydrocarbons derived from the polymerization and hydrogenation of a petroleum feedstock. A preferred blend of this invention comprises between about 65 and about 80 wt. % amorphous polypropylene or a copolymer thereof, between about 8 and about 12 wt. % of isotactic polypropylene containing not more than 5% of syndiotactic polypropylene and between about 10 and about 30 wt. % of said hydrocarbon resin, most preferably a $C_5$ based resinous mixture.

In most coating compositions, the above blend is employed with between about 0.1 and about 5% by weight, preferably between about 0.8 and about 4% by weight of an antioxidant based on the total weight of the blend. Antioxidants which can be employed with the above blends include a blend of primary stericaly hindered phenol and secondary antioxidants such as carbamates or thiodipropanates. Specific examples of effective antioxidants include Ionox 220 and 330, [tris(di-t-butyl-p-hydroxybenzyl)-trimethylbenzene], Dalpac 4C2 [6-di(t-butyl)-p-cresol], Naugawhite (alkylatedbisphenol), Butyl Zimate (zinc dibutyl dithiocarhamate), Ethyl 702 [4,4′-methylene bis(2,6-di-tert-butylphenol)-]and Irganox 1010 [tetrakis(methylene-3′,5′-di-b-butyl-4′-hydroxyphenyl)propionate]methane used in combination with Cyanox 1212 [laurylstearyl thiodipropionate]. A particularly effective antioxidant is Irganox 1010, employed in a concentration of from about 3 to about 4 wt. % based on the total weight of the blend.

The amorphous component of the present blend is an amorphous α-olefinic polymer composed mainly of polypropylene and includes amorphous propylene homopolymer which is hexane soluble, has a melting point of between about 125° and about 175° C. and a Tg of between about 250° and about 260° K. The amorphous polypropylene is formed in minor amounts during the production of crystalline polypropylene by the polymerization of propylene in the presence of stereospecific catalysts, for example, as disclosed in U.S. Pat. No. 3,679,775, incorporated herein by reference. Solid amorphous polypropylene suitably employed herein has a viscosity of from about 100 to 50,000 cps at 190° C., preferably from about 100 to about 15,000 cps at 190° C. Both the amorphous and isotactic propylene polymer components of the present blend include propylene homopolymer, copolymers and terpolymers wherein the concentration of propylene monomer is at least 70% of the amorphous or crystaline polymeric component. Suitable comonomers for the above propylene polymers include ethylene, butylene, vinyl acetate, styrene, butadiene, and other α-olefinically unsaturated monomers and mixtures thereof.

The polymer of crystalline polypropylene optionally employed in the present blend is hexane insoluble and is totally or mainly comprised of isotactic polypropylene having a viscosity of from about 100 to about 100,000 cps at 190° C., preferably from about 250 to about 40,000 cps at 190° C., a melting point of between about 176° and about 189° C. and a Tg of from about 255° to about 270° K.

The preferred crystalline component of the present blend includes isotactic and syndiotactic propylene homopolymers and mixtures thereof; although allomeric copolymers and terpolymers of crystalline polypropylenes, which contain not more than 20% comonomer, can also be employed. Suitable comonomers are those indicated above and may also include the polyabllomers disclosed in U.S. Pat. No. 3,529,037.

The resinous hydrocarbon component in the above blend is a non-oxygenated, resinous mixture of $C_4$ to $C_{10}$ hydrocarbons. These include mixtures containing butene, isoprene, terpene, and the like which are obtained from a polymerized and/or hydrogenated petroleum feedstock. Resinous mixtures have a softening point between about 80° and about 150° C., low acid number less than 1, and Brookfield viscosities at 190° C.

of from about 100 to about 1200 cps are recommended for the blends of the present invention.

The resin which is most beneficially employed as a component of the present blend is the $C_5$ hydrocarbon mixture, Eastotac H-130, supplied by Eastman Chemical Products Inc., properties of which are given in Table A. Resins of this type are compatible with many products including ethylene-vinyl acetate copolymers, dioctyl phthalate, wood rosin esters, styrene-butadiene copolymers and other resins and waxes. Such resins are also soluble in many organic compounds, e.g. chloroform, heptane, hexane, methyl chloride, toluene, xylene and halogenated ethylenes.

TABLE A

| TYPICAL PROPERTIES OF FASTOTAC ™ RESIN | |
|---|---|
| PROPERTY | H-130 |
| Physical form | Flake |
| Color, Gardner, ASTM D 1544 | 4 |
| Acid number | 0.1 |
| Density, 73° F. (23° C.), gm/cm$^3$ | 1.04 |
| Viscosity, Brookfield Thermosel, 374° F. (190° C.), cP | 1000 |
| Ring and ball softening point, ASTM E-28, °F. (°C.) | 266 (130) |
| Bromine number | 5 |
| Chlorides, organic, ppm | 3 |
| inorganic, ppm | 3 |
| Ash, % | <0.002 |
| Flash point, Cleveland Open Cup, °F. (°C.) | 570 (299) |
| Fire point, Cleveland Open Cup, °F. (°C.) | 617 (325) |

The presence of the resin component in the blend is critical since the interaction between the amorphous propylene polymer and the $C_4$ to $C_{10}$ resin provides highly desirable flow rates and flow characteristics at acceptable coating temperatures such that a cohesive film and inerlocked bonding with fibers to a controlled penetration of the substrate is achieved. Other blends, while flowable at coating temperatures, have little or no fiber substantivity and thus do not provide the interlocking fiber bonding which is characteristic of the present blend. Additionally, such other blends display uncontrolled penetration into the substrate which may vary from a discrete layer contiguous with the substrate surface to excessive penetration through the substrate which results in an objectionably stiff product. The moisture barrier function of these prior blends is provided solely by polymer itself; whereas in the present blend a more durable moisture proof barrier having high flexibility is realized by the fiber interlocking capability in addition to the hydrophobic capacity of the thermoplastic blend.

Coatings of the present blends provide a continuous, pin-hole free film of unusually high flexibility which are inherently adhesive, moisture-proof and have a very soft hand. Adhesion of these coatings evidence strong bonding to woven and non-woven substrates having the ability to interlock in voids between fibers. Moreover, coatings having all of these properties are achieved with coatings of only 0.65 to 1.5 mils thickness thus realizing extremely small load requirements for a desired effect; however, thicknesses of up to 5 mils or more can be applied for certain uses where flexibility is not a major factor. Accordingly, they are suitable for textiles and all wearing apparel in contact with the skin.

The unique combination of properties inherent in the present blends makes them particularly suitable for use as moisture-proof barriers as required for certain uses such as disposable diapers. Generally, the diaper consists of a moisture-proof outer layer, e.g. a polyethylene layer, an intermediate layer of moisture absorbent fluff or other super absorbent material which may be enclosed in a moisture permeable tissue or envelope to hold the fluff in place, and an inner layer of moisture permeable non-woven fiber which is positioned next to the skin. Various techniques have been developed to prevent displacement of the fluff layer, e.g. fine line adhesion to the moisture impermeable outer layer. However, a problem persists in sealing the outer layer to the inner layer along an edge or edges of the diaper while creating a moisture-proof barrier to prevent upward flow of moisture contained within the diaper and caused by capillary action. A leading commercial product provides a discrete, preformed non-adhesive film as a moisture barrier which is positioned between the inner and outer layers along the waist area of the diaper and which is separately adhered thereto by application of an adhesive to marry the adjacent inner and outer layers disposed on either side of the film and to provide a moisture resistant barrier along the waist area and/or side areas. This arrangement is not entirely satisfactory since the spaces between adhesion points provide occasion for moisture leakage and wicking above and below the insert can result in the wetting of upper clothing. Also the non-adhesive property of the film fails to provide a bond with the non-woven layer. Application of a continuous adhesive layer on both sides of the film has also proven unsatisfactory since the waist band becomes bulky and less flexible in many cases leading to chafing and skin irritation.

The present blend overcomes these difficulties by its ability to be directly and uniformly coated and bonded to the non-woven layer surface and to the inner surface of the polyethylene sheet; thus joining the inner and outer layers and providing a strong, flexible, fiber interlocking bond with the non-woven sheet. Its natural moisture repellent properties prevents upward flow of moisture beyond the lower margin of the coated waist band and side areas and the ability to form a continuous film on the non-woven layer surface with interlocking in the voids of non-woven fibers prevents separation and access of the infant to the soiled filler material. The low load coating requirement for adequate bonding (0.75-1.5 mils) provides a body moldable area which exhibits the same softness as the inner non-woven sheet positioned against the skin.

The sheets with coating between are sealed with pressure to provide partial penetration of coating into the non-woven substrate, preferably to a depth of from about 10 to 30%. The small amount of coating needed and the fast set time of the present blend, e.g. 35 sec. depending on coat thickness, provides economies in materials and allows for a high rate of production. The same moisture-proof bonding with the present blend can be applied to the side areas of the diaper, if desired.

The present compositions are prepared by mixing the antioxidant, the hydrocarbon resin and the amorphous polypropylene components at a temperature of between about 300° and about 400° F. The crystalline polypropylene, when employed, is then added to the resulting melt and mixed therein until a homogeneous composition is obtained. For certain applications, it may be desirable to add a color component to the composition, however, the use of a coloring agent is optional and does not enhance the coating properties. Any heat stable oil-soluble dyes or pigment dispersion which is compatible with the polymer systems is suitable for this purpose. For use in coating non-woven fibers, for example, diapers, a non-irritating blue dye, such as anthraquinone, is often added for aesthetic effect.

Other conventional additives, such as plasticizers, are optionally added to the present compositions, but do not enhance the basic properties of the blend. Suitable plasticizers include mineral oil, polybutenes, polyethylene waxes, petrolatum, liquid hydrocarbons, hydrogenated methyl esters of rosins, and the like.

After the above homogeneous mixture of components is obtained, the product is cooled and the resulting solid packaged for storage or direct shipment to a manufacturer in the form of flakes, powder, granules or any other convenient form.

The coating procedure includes heating to melt the solid product, e.g. at a temperature between about 325° F. to about 350° F., coating the resulting melt on a substrate in a thickness of from about 0.65 to about 5 mils, preferably from about 0.75 to about 1.5 mils, and allowing the coating to cool. Since the present composition is a hot melt adhesive, the cooling procedure allows the material to set and form a continuous, pin-hole free, flexible layer which forms a strong bond with the substrate. It is desirable to control retention of the adhesive coating in and on the surface of the substrate so as to avoid excessive penetration, consequent stiff hard hand and a discontinuous coating which result from such coatings of polyethylene, ethylene/vinyl acetate copolymers, block copolymers of styrene and butadiene, styrene and isoprene, etc. A unique property of the present adhesive blend involving polypropylene combined with instant high melting fast setting polymer, namely the present resin is that the bulk of the coating material remains substantially on and in the interface area of the substrate, such as the polyethylene, rayon, polypropylene, linear low density polymers and other substrates, thus providing a highly flexible continuous film having a softer non-abrasive hand. In the case of woven or non-woven material, the present composition interlocks with the fabric so that the moisture free barrier is more strongly bonded to the surface.

Many benefits are realized in the coating procedure using the present composition. Specifically, the open time (tack time unaided by cooling) is very rapid, e.g. about 35–45 seconds. The tack time can be improved to less than 5 seconds by chilling. Because of their short open time, the present composition is ideally suited for assembly line coating of materials during manufacture.

The coating temperature which falls within the range of from about 300° F. to about 500° F. is directly proportional to the viscosity of the composition selected. Generally, blend composition viscosities between about 4,000 and 150,000 cps at 325° F. (162.8° C.) are employed, however viscosities of from about 4,000 to about 100,000 are most desirable. For superior results it is recommended that the coating temperature for a viscosity in the range of from 5,000 to about 11,000 cps be between 325° F. (162.8° C.) and about 350° F. (176.7° C.).

The moisture-proof adhesive compositions of the present invention have a wide variety of applications and uses which, in addition to moisture-proof barriers for disposable diapers, include bedliners, sanitary napkins, e.g. those having the construction disclosed in U.S. Pat. No. 4,627,847, incorporated herein by reference, and other uses which will become apparent to one skilled in this art, such as rainproof textile coatings, etc.

Having thus generally described the invention, reference is now had to the following examples which are employed for illustrative purposes only and are not to be construed as limiting to the scope of the invention as more broadly set forth above and in the appended claims.

EXAMPLE 1

Preparation of Adhesive Blend

In a pyrex beaker, 22.5 g. of hydrocarbon resin (Eastotac H-130) was melted at 275° F. After the resin was completely melted, 62.5 g. of amorphous polypropylene having a viscosity of 900 at 374° F. (190.6° C.) and 1.0 g. of antioxidant (Iraganox 1010) were blended under a blanket of nitrogen with stirring for 1 hour at a temperature of 335–345° F. A homogeneous blend resulted, to which was then added 14 g. of crystalline polypropylene having a melt flow of 30–40. The temperature was increased to 375–380° F. (190.6–193.3° C.) and mixing was continued for four additional hours until a homogeneous blend was achieved. The resulting blend having a melt viscosity of 11,000 cps at 325° F. (162.8° C.) was allowed to cool to room temperature and was then packaged for subsequent use.

EXAMPLE 2

Several dry samples of coating blends noted in Table B were melted to a homogeneous viscous liquid. The resulting liquid blends were then individually coated on a 6 × 3 inch sample of rayon-polyester using an extrusion applicator. The initial coatings on the substrate which were applied in a thickness of 1.5 mils, were then cooled for thermoset and examined for pin-hole free film continuity. Samples having non-continuous films were set aside and the above coating method was repeated with increasing coat thicknesses until a continuous film was achieved. The properties of the samples and coating thicknesses were then compared, the results of which are reported in Table B.

TABLE B

| | KRATON 1107 (1) Styrene-isoprene- | EPOLENE C-10 (2) | ELVAX (3) ethyl vinyl | Blend of | VESTOPLAST (4) ethylene-butylene | STEREON (5) styrene-butadiene |
|---|---|---|---|---|---|---|
| BLEND | styrene-copolymer | polyethylene | acetate polymer | Example 1 | copolymer | block copolymer |
| Coat wt. required for pinhole free coating | 2.5–3 mils | 2.5–3 mils | 2 mils | 1.5 mils | 1.5 mils | 2.5–3 mils |
| Open time (tack) | 3 min. | 1–2 min. | 2–3 min. | 30–60 sec. | 1–2 min. | 2–3 min. |
| End seal bond | poor | poor | poor | excellent | good initially, but deteriorates with age | fair |
| Hand | harsh | very harsh | very harsh | soft | soft | somewhat harsh |
| Ease of | good | fair | poor, congeals | excellent | good | fair-good |

TABLE B-continued

PROPERTIES OF COATINGS ON RAYON-POLYESTER SUBSTRATES

| BLEND | KRATON 1107 (1) Styrene-isoprene-styrene-copolymer | EPOLENE C-10 (2) polyethylene | ELVAX (3) ethyl vinyl acetate polymer | Blend of Example 1 | VESTOPLAST (4) ethylene-butylene copolymer | STEREON (5) styrene-butadiene block copolymer |
|---|---|---|---|---|---|---|
| application | | | on nozzle | | | |

(1) supplied by Shell Chemical Co.
(2) Supplied by Eastman
(3) supplied by E. I. DuPont
(4) supplied by Huels Corp.
(5) supplied by Firestone Synthetic Rubber & Latex Co.

It will be apparent from the foregoing disclosure that many modifications and variations in the above example illustrating the adhesive blend of this invention and the method of coating the rayon-polyester substrate or other substrates commonly used for the purposes described, can be made without departing from the scope of this invention.

Having thus described the invention, what is claimed is:

1. An adhesive moisture-proof coating composition which comprises:
   (a) between about 40 wt. % and about 95 wt. % of an amorphous polymer containing at least 70% propylene monomer;
   (b) between about 5 wt. % and about 40 wt. % of a hydrocarbon resinous mixture of $C_4$ to $C_{10}$ hydrocarbons derived from the polymerization and hydrogenation of a petroleum feed stock; and
   (c) between about 8 wt. % and about 50 wt % of a crystalline polymer containing at least 70% propylene monomer.

2. The composition of claim 1 which additionally contains between about 0.1 wt. % and about 5 wt. % of an antioxidant.

3. The composition of claim 1 wherein at least one of the components (a) and (c) is a propylene polymer containing a dissimilar α-olefinically unsaturated comonomer.

4. The composition of claim 3 wherein said comonomer is selected from the group consisting of ethylene, butylene, vinyl acetate and mixtures thereof.

5. The composition of claim 1 wherein at least one of components (a) and (c) is a propylene homopolymer.

6. The composition of claim 5 wherein component (c) is an isotactic or syndiotactic propylene homopolymer.

7. The composition of claim 6 which additionally contains between about 0.1 wt. % and about 5 wt. % of an antioxidant.

8. The composition of claim 1 comprising:
   (a) between about 65 wt. % and about 80 wt. % of amorphous propylene homopolymer;
   (b) between about 10 wt. % and about 30 wt. % of said hydrocarbon resinous mixture consisting primarily of a $C_5$ hydrocarbon;
   (c) between about 8 wt. % and about 12 wt. % of crystalline polymer of propylene and
   (d) between about 1 wt. % and about 4 wt. % based on weight of (a), (b) and (c) of an antioxidant said composition having a Brookfield viscosity of from about 4,000 cps to about 150,000 cps at 325° F.

* * * * *

UNITED STATES PATENT AND TRADEMARK OFFICE
CERTIFICATE OF CORRECTION

PATENT NO. : 4,939,202

DATED : July 3, 1990

INVENTOR(S) : Maletsky et al.

It is certified that error appears in the above-identified patent and that said Letters Patent is hereby corrected as shown below:

Col. 2, line 8    Delete " stericaly " and substitute -- sterically --

Col. 2, line 9    Delete " phenol " and substitute -- phenols --

Col. 2, line 14    Delete " dithiocarhamate " and substitute -- dithiocarbamate --

Col. 2, lines 59-60    Delete " polyabllomers " and substitute -- polyallomers --

Signed and Sealed this

Twenty-ninth Day of October, 1991

Attest:

HARRY F. MANBECK, JR.

*Attesting Officer*    *Commissioner of Patents and Trademarks*